United States Patent [19]

Rolls

[11] Patent Number: 5,892,773
[45] Date of Patent: Apr. 6, 1999

[54] RADIO FREQUENCY CABLE TO OPTICAL FIBER CABLE CONVERTER/INTERFACE

[75] Inventor: Harold S. Rolls, Annapolis, Md.

[73] Assignee: The United States of America as represented by the Secretary of the Navy, Washington, D.C.

[21] Appl. No.: 905,703

[22] Filed: Jun. 29, 1992

Related U.S. Application Data

[63] Continuation of Ser. No. 513,473, Apr. 10, 1990, abandoned.

[51] Int. Cl.$^6$ ........................................................ H04J 1/02
[52] U.S. Cl. ............................................ 370/480; 333/109
[58] Field of Search ..................................... 370/295, 480, 370/497; 359/113, 109, 115, 174, 117; 333/100, 101, 109, 110, 111

[56] References Cited

U.S. PATENT DOCUMENTS

| | | | |
|---|---|---|---|
| 4,236,243 | 11/1980 | Davis et al. | 359/132 |
| 4,354,167 | 10/1982 | Terreault et al. | 333/109 |
| 4,545,048 | 10/1985 | Hawk et al. | 370/37 |
| 4,633,202 | 12/1986 | Basile et al. | 333/109 |
| 4,635,274 | 1/1987 | Kutoba | 370/30 |
| 5,191,459 | 3/1993 | Thompson et al. | 359/133 |

*Primary Examiner*—Huy D. Vu
*Attorney, Agent, or Firm*—James B. Bechtel, Esq.

[57] ABSTRACT

A bidirectional converter/interface for connecting several two-way broadband RF cables to a single pair of optical fibers is provided. In the reception mode, a broadband RF carrier of an optical conductor signal is directed to a plurality of bandpass filter/block converter combinations. These filter/converter combinations segment the broadband RF carrier into predetermined RF bands carrying the information. Each segmented band is then shifted (either up or down) to the receiving band frequency utilized by each of the RF systems. In the transmission mode, each transmitted signal from one of the RF systems is passed to a return path block converter/bandpass filter combination that shifts the entire transmitted band to a predetermined band. The predetermined bands are chosen such that each is a unique, non-overlapping band associated with a particular one of the RF systems. These unique bands are then combined into a single RF broadband signal that is converted to an optical signal and carried by a second optical conductor. The duplex operation of the RF systems is supported by the use of high split diplex filters. The diplex filters pass the forward fed receiving RF frequency and bandwidth signal to the RF systems, and pass the return fed transmitting RF frequency and bandwidth signal from the RF systems through to the return path.

6 Claims, 2 Drawing Sheets

RADIO FREQUENCY CABLE TO OPTICAL FIBER CABLE CONVERTER/INTERFACE

This application is a continuation of application Ser. No. 07/513,473 filed Apr. 10, 1990 now abandoned.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to electro-optic interfaces and more particularly to converters for connecting cables carrying radio frequency transmissions to fiber optic cables.

BACKGROUND OF THE INVENTION

Existing RF communications networks comprise large numbers of individual broadband RF systems. Typically, the RF systems share a common RF band for reception and a common RF band for transmission that is different from the receiving RF band, thereby providing for simultaneous reception and transmission. Accordingly, in forming a secure communications link between the individual RF systems, it is necessary to provide distinct transmission and reception paths. Further, it is desirable that each individual RF system be able to communicate with any other RF system in the network.

When metallic conductors are used to link a plurality of RF systems, the connecting cable must be shielded from electromagnetic and electrostatic radiation. Also, using metallic conductors results in transmitted data not being secure against unauthorized detection by common and well known means. In addition, faults in metallic transmission cable may result in arcing thus causing a fire hazard. Further, electrical isolation and impedance matching are required. Where two or more metallic cables are in proximity to each other, adjacent cables are susceptible to electromagnetic cross-talk and interference. All of these problems are avoided by optical fiber transmissions.

The use of fiber optic transmission links in all forms of communication systems is rapidly expanding because fiber optic systems have tremendous advantages over metallic conductor links. Besides being smaller and lighter than metallic conductor systems, fiber optic systems offer complete electrical isolation, extremely high-speed wideband capability, low signal attenuation, and complete immunity to both noise and broadband spectrum interference. The use of RF signal devices with fiber optic cable requires the conversion of the RF signal to one that can be transmitted over an optical fiber path. Since signals from multiple broadband RF systems require separate optical paths, the connecting fiber optic cable is large and bulky in a communications network supporting large numbers of individual broadband RF systems.

SUMMARY OF THE INVENTION

The invention is a new and novel bidirectional converter/interface for connecting several two-way broadband radio frequency cables to a single pair of optical fibers. This feature provides for simultaneous communication between multiple RF systems operating in the same frequency band through a single pair of optical fibers. The invention comprises a plurality of analog-to-RF, RF-to-analog and band splitter converters. An object of this invention is to utilize the complete bandwidth of a pair of optical fibers as a transportation trunk for a plurality of broadband radio frequency communication systems. Another object is to allow the use of outputs in an analog mode through coaxial cables. An advantageous feature of the invention is its ability to simultaneously transmit signals from multiple RF systems over a single pair of fiber optic conductors and then separate the individual signals one from another at a receiver. Such multiplexing increases the quantity of broadband data such as, video and voice, which can be transmitted simultaneously through a single pair of optical fibers. This increase may be several orders of magnitude, dependent only on the number of communication sites and the optical fiber bandwidth.

Other objects and advantages of the present invention will become more obvious hereinafter in the specification and drawings.

BRIEF DESCRIPTION OF THE DRAWINGS

These and other features, objects and advantages of the present invention will be better appreciated from an understanding of the operative principles of a preferred embodiment as described hereinafter and as illustrated in the accompanying drawings wherein.

DETAILED DESCRIPTION OF THE INVENTION

Figure 1:
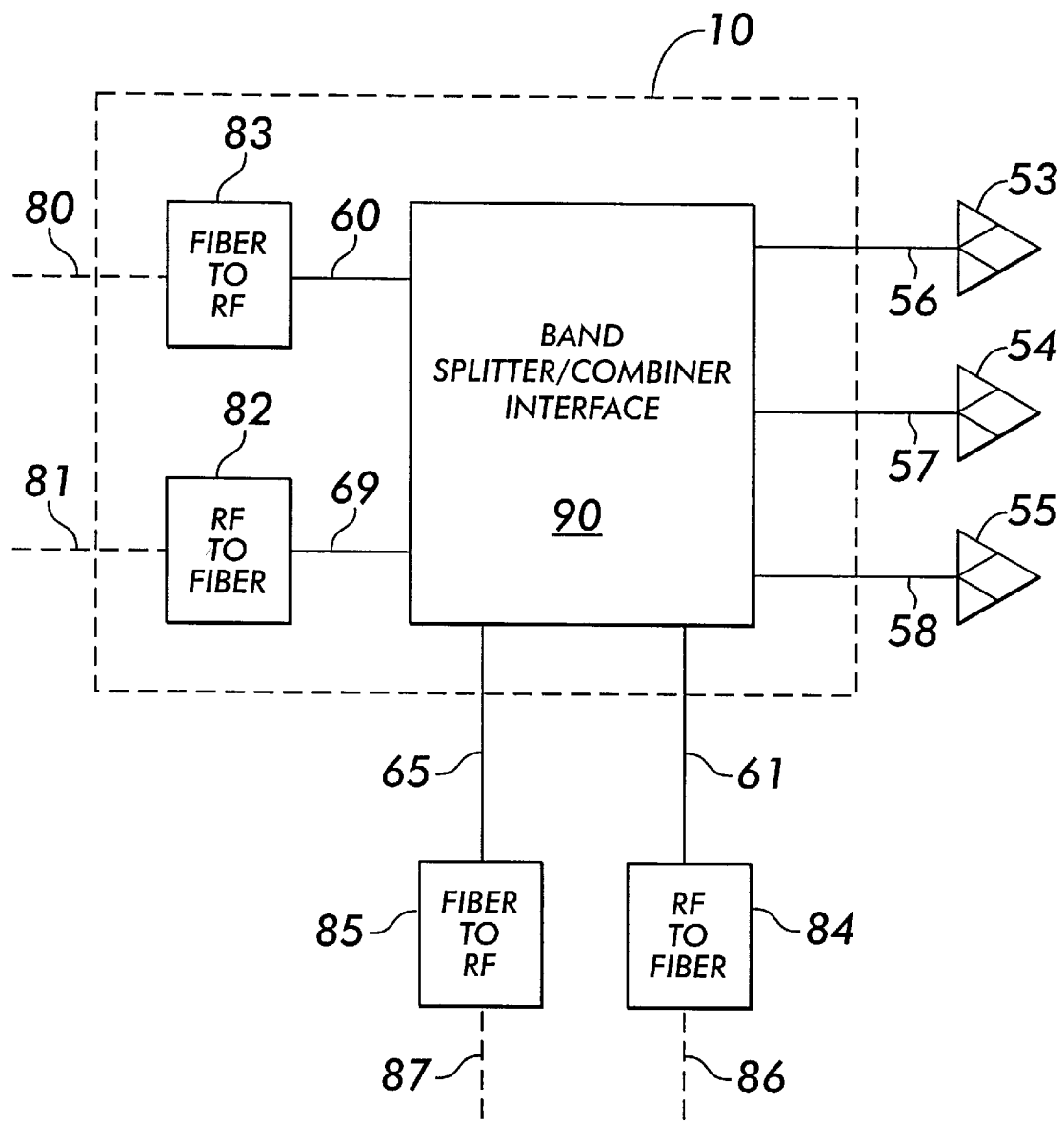
FIG. 1 is a block diagram depicting a bidirectional converter/interface suitable for connecting a plurality of broadband radio frequency cables to a single pair fiber optic cable.
Figure 2:
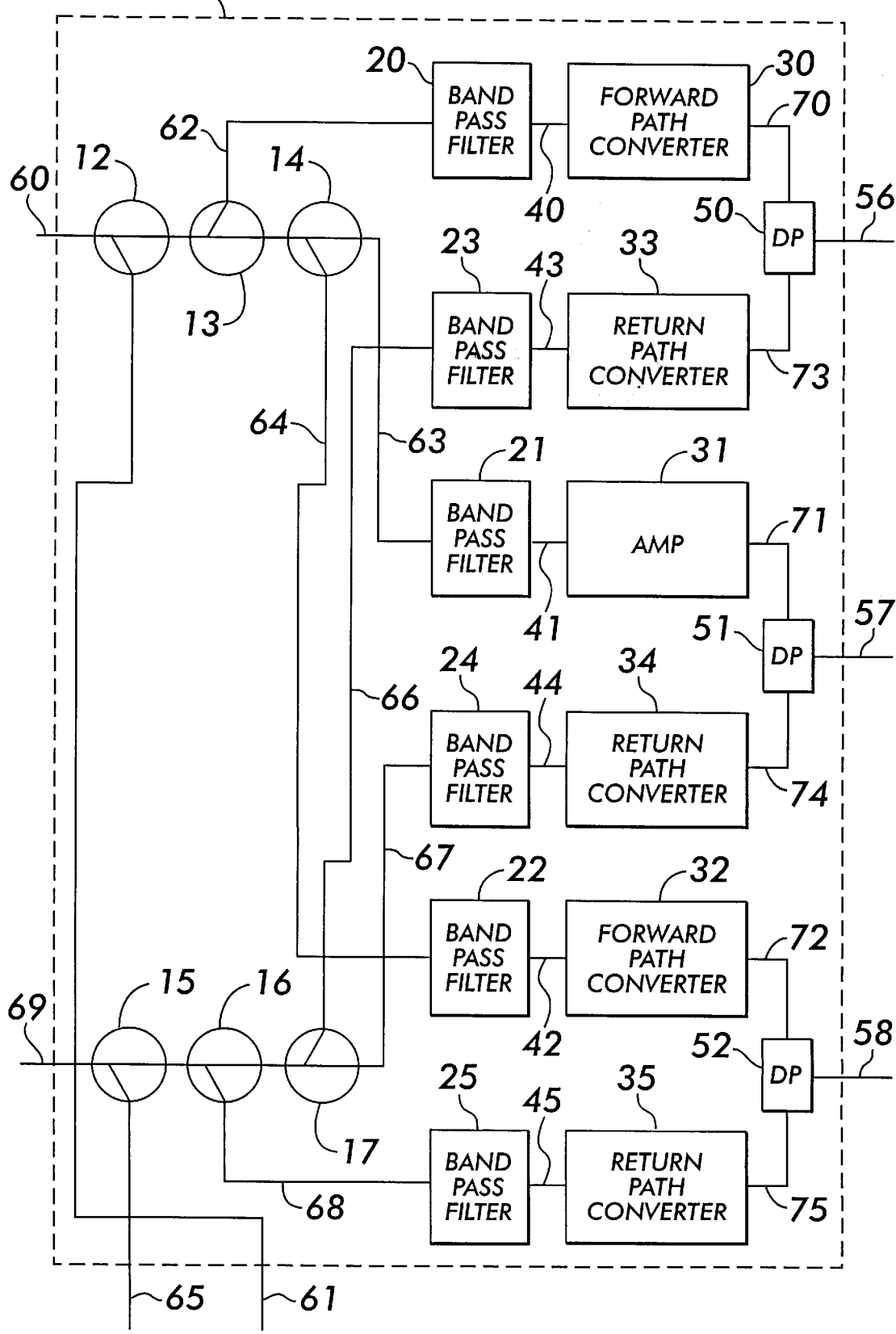
FIG. 2 is a block diagram depicting the relationship of the various components of a bidirectional band splitter/combiner interface according to the present invention.

Referring now to FIGS. 1 and 2, one embodiment of a bidirectional converter/interface 10 suitable for connecting a broadband radio frequency cable to single pair fiber optic cable will be described. By way of example, the present invention will be explained for three RF systems where each RF system receives on a frequency/bandwidth of 220 to 400 MHz and transmits on a frequency/bandwidth of 5 to 180 MHz. However, it will be readily apparent that the present invention is easily adapted to operate with any frequency/bandwidth for any number of RF systems sharing the same receiving frequency/bandwidth and the same transmitting frequency/bandwidth.

In the forward data path, analog or digital data modulated on a light carrier, having a bandwidth from 15 to 600 MHz, is transmitted through an optical fiber 80. A fiber-to-RF analog converter 83 converts the optical signal to analog data modulated on a broadband radio frequency (RF) carrier of the same bandwidth as that of optical fiber 80. The modulated RF carrier is then passed by coaxial cable 60 to a band splitter/combiner interface 90 shown in greater detail in FIG. 2. Specifically, the modulated RF carrier on cable 60 is input to a cascading series of broadband directional couplers 12, 13 and 14 as shown in FIG. 2.

The output tap leg of first coupler 12 is connected to RF-to-fiber analog converter 84 by coaxial cable 61 to transmit data over optical fiber 86 to an adjacent station (not shown) of a communication network. The output of the feed through of first coupler 12 is connected to the input of second coupler 13. The output of the tap leg of second coupler 13 is connected to the input side of band pass filter 20 by coaxial cable 62. The pass-band of filter 20 is 20 to 200 MHz. Output of band pass filter 20 is connected, by coaxial cable 40, to the input of forward path block converter 30 which shifts the entire frequency spectrum (20 to 200 MHz) up 200 MHz for an output frequency spectrum of 220 to 400 MHz.

The output of forward path block converter 30 is connected to the highband tap leg of high split diplex filter 50 by coaxial cable 70. High split diplex filter 50 is further connected to a first broadband RF system 53 by combined forward and return system cable 56. The purpose of filter 50 is to combine or divide a bidirectional signal as is known in the art. Briefly, a diplex filter properly routes incoming signals on separate forward (highband) and return (lowband) cables onto a single cable. Conversely, forward and return signals entering the diplex filter on the single cable are separated into a high or low band and are output on a separate high or low band line, respectively.

The output of the feed through of second coupler 13 is connected to the input of third coupler 14. The output of the tap leg of third coupler 14 is connected, by coaxial cable 64, to the input side of band pass filter 22. The pass-band of filter 22 is 420 to 600 MHz. The output of band pass filter 22 is connected, by coaxial cable 42, to forward path block converter 32 which shifts the entire frequency spectrum (420 to 600 MHz) down 200 MHz generating an output frequency spectrum of 220 to 400 MHz. The output of forward path block converter 32 is connected to the highband tap leg of high split diplex filter 52 by coaxial cable 72. High split diplex filter 52 is further connected to a second broadband RF system 55 by coaxial cable 58.

The output of the feed through of third coupler 14 is connected to the input side of band pass filter 21 by coaxial cable 63. The pass-band of filter 21 is 220 to 400 MHz. The output of band pass filter 21 is amplified by connector to the input of a broadband amplifier 31 by coaxial cable 41. The output of amplifier 31 is connected to the high band port of high split diplex filter 51 by coaxial cable 71 for supply thereto of a signal that is not frequency shifted as in the case of the signal output of converter 30 to filter 50 hereinbefore described. High split diplex filter 51 is further connected to a third broadband RF system 54 by coaxial cable 57.

In the return data path, RF data is coupled from the return output of each broadband RF system 53, 54 and 55 through respective combined forward and return cables 56, 57 and 58 to the combined port of respective diplex filters 50, 51 and 52 where lowband return signals are filtered to a low frequency port thereof. Referring again to FIG. 2, the path of a typical return output is traced through band splitter/combiner 90. As mentioned above, the standard frequency band of 5 to 180 MHz is used in this example.

The transmission or return output of a first broadband RF system 53 is transferred to the combined port of high split diplex filter 50 through combined forward and return system cable 56. The lowband output high split diplex filter 50, is connected to return path block converter 33 with coaxial cable 73. Return path block converter 33 shifts the complete frequency band up 15 MHz generating an output frequency band of 20 to 195 MHz. Output of return path block converter 33 is connected with coaxial cable 43 to the input of band pass filter 23 which has a bandwidth of 20 to 195 MHz. The output of band pass filter 23 is connected by coaxial cable 66 to the tap port of a third coupler 17 of a cascading series of three broadband directional couplers 15, 16 and 17. In the return RF path, directional couplers 15, 16 and 17 are used in reverse to combine separate bands in the return path onto a single coaxial cable 69.

Return output of a third broadband RF system 54 is transferred to the combined port of high split diplex filter 51 through combined forward and return system cable 57. The lowband output of high split diplex filter 51 is connected to return path block converter 34 with coaxial cable 74. Return path block converter 34 shifts the complete frequency band up 217.5 MHz generating an output frequency band of 222.5 to 397.5 MHz. The output of return path block converter 34 is connected with coaxial cable 44 to the input of band pass filter 24 which has a bandwidth of 225.5 to 397.5 MHz. The output of band pass filter 24 is connected by coaxial cable 67 to coupler 17 where it is combined with the signal received at the tap port of coupler 17.

Return output of a third broadband RF system 55 is transferred to the combined port of high split diplex filter 52 through combined forward and return system cable 58. The lowband output high split diplex filter 52 is connected to return path block converter 35 with coaxial cable 75. Return path block converter 35 shifts the complete frequency band up 420 MHz generating an output frequency band of 425 to 600 MHz. Output of return path block converter 35 is connected with coaxial cable 45 to the input of band pass filter 25 which has a bandwidth of 425 to 600 MHz. The output of band pass filter 25 is connected by coaxial cable 68 to the tap port of coupler 16 where it is combined with the signals combined by coupler 17.

The combined inputs of the return directional couplers 16 and 17 are connected to the output feed of directional coupler 15. Coupler 15 is used to combine 1) return optical signals from an adjacent station (not shown) via optical fiber 87, fiber-to-RF analog converter 85 and coaxial cable 65, and 2) the combined signals from bands previously introduced in the coupler cascade. The input port of coupler 15 in the return cascade is connected by coaxial cable 69 to the input port of RF-to-fiber optic analog converter 82 and is transmitted through an optical fiber return path 81 to the next upstream bidirectional converter/interface (not shown).

The advantages of the present invention are numerous. In general, the present invention uses the full bandwidth capability of a first optical conductor to forward feed a plurality of broadband RF systems in a communications network. Each of the RF systems operate on the same receiving RF frequency and bandwidth and on the same transmitting RF frequency and bandwidth. The receiving and transmitting frequencies and bandwidths are different from one another to allow simultaneous reception and transmission as is known in the art. These are typically existing broadband RF systems that are connected together to form a communications network in a cost effective manner. At present, the most cost effective manner of connection would utilize fiber optic technology. However, an optical conductor can only be utilized to its fullest potential if the bands of information can be effectively separated.

The present invention achieves separation of the bands in the forward or reception mode by directing a broadband RF carrier of the optical conductor signal to a plurality of bandpass filter/block converter combinations. These filter/converter combinations segment the broadband carrier into predetermined RF bands carrying the information. Each segmented band is then shifted (either up or down) to the receiving band frequency utilized by each of the RF systems. In the return or transmission mode, each transmitted signal is passed to a return path block converter/bandpass filter combination that shifts the entire band to a predetermined return band. The predetermined return bands are chosen such that each is a unique, non-overlapping band assigned to a particular RF system. These unique bands are then combined into a single RF broadband signal that is converted to an optical signal and carried by a second optical conductor. The duplex operation of the RF systems is supported by the use of high split diplex filters. The diplex filters pass the forward fed receiving RF frequency and bandwidth signal to the RF systems, and pass the return fed transmitting RF frequency and bandwidth signal from the RF systems through to the return path.

The advantage of this system is that a plurality of existing RF communication systems can receive/transmit information on a single optical fiber conductor pair without the need for separate optical paths. This reduces the size and cost of an optical cable system. The number of RF systems that can be supported by an optical conductor pair is determined by the bandwidth capability of the optical conductors and the receiving/transmitting frequency bandwidth used by the RF systems.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A multiple bidirectional converter/interface device transmitting signals carried by a forward path optical conductor having a fixed bandwidth capability to a plurality of RF systems, wherein each of said RF systems operates on a common receiving RF frequency and bandwidth that is less than said fixed bandwidth capability of the forward path optical conductor and transmits signals produced to a return path optical conductor having a fixed bandwidth capability, and wherein each of the RF systems operates on a common transmitting RF frequency and bandwidth that is less than said fixed bandwidth capability of the return path optical conductor and different from the common receiving RF frequency and bandwidth, said device comprising: means receiving the signals carried by the forward path optical conductor for conversion to a broadband RF carrier signal having a bandwidth equal to or greater than the fixed bandwidth capability of the forward path optical conductor; means for directing the broadband RF carrier signal onto a plurality of forward signal paths: means connected to each of the forward signal paths for segmenting the broadband RF carrier signal into non-overlapping RF band segments and conversion thereof into signals having the common receiving RF frequency and bandwidth; a plurality of high split diplex filters connected by the forward signal paths to the means for segmenting, each of said high split diplex filters having a first band port connected to one of the forward signal paths, a second band port and a combined band port, said first band port receiving and passing the signals having the common receiving RF frequency and bandwidth, said combined band port transmitting the signals having the common receiving RF frequency and bandwidth to one of the plurality of RF systems and receiving a signal having the common transmitting RF frequency and bandwidth from the one of the plurality of RF systems, and said second band port passing the signal having the common transmitting RF frequency and bandwidth onto one of a plurality of return signal paths; means in each of the return signal paths for converting the signal having the common transmitting RF frequency and bandwidth to a return signal in each of the return signal paths having unique non-overlapping RF bands within a bandwidth equal to that of the signal having the common transmitting RF frequency and bandwidth and less than the fixed bandwidth capability of the return path optical conductor; means in each of the return signal paths for combining each of the return signals into a signal having a single broadband RF bandwidth; and means for converting the signal having the single broadband RF bandwidth into an optical signal transmitted through the return path optical conductor.

2. A device as in claim 1 wherein said means for segmenting and converting comprises:

a bandpass filter for passing the selected RF band segment of the broadband RF carrier signal, wherein the bandwidth of the selected RF band segment is equal to the receiving RF bandwidth; and means for shifting the frequency of the selected RF band segment to correspond to the receiving RF frequency.

3. A device as in claim 2 wherein said shifting means comprises a block converter.

4. A multiple bidirectional converter/interface device transmitting signals carried by a forward path optical conductor having a fixed bandwidth capability to a plurality of broadband RF systems, wherein each of said RF systems operates on a common receiving RF frequency and bandwidth that is less than said fixed bandwidth capability of the forward path optical conductor and transmits signals produced by the plurality of RF systems to a return path optical conductor having a fixed bandwidth capability, and wherein each of the RF systems operates on a common transmitting RF frequency and bandwidth that is less than said fixed bandwidth capability of the return path optical conductor and different from the common receiving RF frequency and bandwidth, said device comprising: means receiving the signals carried by the forward path optical conductor for conversion to a broadband RF carrier signal having a bandwidth equal to or greater than the fixed bandwidth capability of the forward path optical conductor; means for directing the broadband RF carrier signal onto a plurality of forward signal paths respectively having high split diplex filters therein; means connected to the forward signal paths for segmenting the broadband RF carrier signals into non-overlapping selected RF band segments and conversion thereof into signals having the common receiving RF frequency and bandwidth; each of said high split diplex filters having a first band port connected to one of the forward signal paths, a second band port and a combined band port, said first band port receiving and passing the signal having the common receiving RF frequency and bandwidth, said combined band port transmitting the signals having the common receiving RF frequency and bandwidth to one of the plurality of RF systems and receiving a signal having the common transmitting RF frequency and bandwidth from the one of the plurality of RF systems, and said second band port passing the signal having the common transmitting RF frequency and bandwidth onto one of a plurality of return signal paths; means in each of the return signal paths for converting the signal having the common transmitting RF frequency and bandwidth to a return signal in each of the return signal paths having unique non-overlapping RF bands within a bandwidth equal to that of the signal having the common transmitting RF frequency and bandwidth and less than fixed bandwidth capability of the return path optical conductor, means in each of the return signal paths for combining each of the return signals into a signal having a single broadband RF bandwidth; and means for converting the signal having the single broadband RF bandwidth into an optical signal transmitted through the return path optical conductor, said means for directing comprising a plurality of broadband directional couplers connected in a cascading series.

5. A device as in claim 1 wherein said means for converting the signal having the common transmitting RF frequency and bandwidth comprises: means for shifting in frequency the signal having the common transmitting RF frequency and bandwidth to the unique on-overlapping RF bands; and bandpass filter means for passing the signal shifted to the unique non-overlapping RF bands.

6. A multiple bidirectional converter/interface device transmitting signals carried by a forward path optical conductor having a fixed bandwidth capability to a plurality of broadband RF systems, wherein each of said RF systems operates on a common receiving RF frequency and bandwidth that is less than said fixed bandwidth capability of the forward path optical conductor and transmits signals produced by the plurality of RF systems to a return path optical conductor having a fixed bandwidth capability, and wherein each of the RF systems operates on a common transmitting RF frequency and bandwidth that is less than said fixed bandwidth capability of the return path optical conductor and different from the common receiving RF frequency and bandwidth, said device comprising: means receiving the signals carried by the forward path optical conductor for conversion to a broadband RF carrier signal having a bandwidth equal to or greater than the fixed bandwidth capability of the forward path optical conductor; means for directing the broadband RF carrier signal onto a plurality of forward signal paths respectively having high split diplex filters therein; means connected to the forward signal paths for segmenting the broadband RF carrier signals into non-overlapping selected RF band segments and conversion thereof into signals having the common receiving RF frequency and bandwidth; each of said high split diplex filters having a first band port connected to one of the forward signal paths, a second band port and a combined band port, said first band port receiving and passing the signals having the common receiving RF frequency and bandwidth, said combined band port transmitting the signal having the common receiving RF frequency and bandwidth to one of the plurality of RF systems and receiving a signal having thecommon transmitting RF frequency and bandwidth from the one of the plurality of RF systems, and said second band port passing the signal having the common transmitting RF frequency and bandwidth onto one of a plurality of return signal paths; means in each of the return signal paths for converting the signal having the common transmitting RF frequency and bandwidth to a return signal in each of the return signal paths having unique non-overlapping RF bands within a bandwidth equal to that of the signal having the common transmitting RF frequency and bandwidth and less than fixed bandwidth capability of the return path optical conductor, means in each of the return signal paths for combining each of the return signals into a signal having a single broadband RF bandwidth; and means for converting the signal having the single broadband RF bandwidth into an optical signal transmitted through the return path optical conductor, said means for combining comprising a plurality of broadband directional couplers connected in a cascading series.

\* \* \* \* \*